(12) United States Patent
Lu et al.

(10) Patent No.: US 9,444,602 B2
(45) Date of Patent: Sep. 13, 2016

(54) CONTROL SIGNALING TRANSMISSION METHOD, CONTROL SIGNALING PROCESSING DEVICE, AND TERMINAL

(75) Inventors: Zhaohua Lu, Shenzhen (CN); Xiaodan Zhang, Shenzhen (CN); Kun Liu, Shenzhen (CN); Dihao Ning, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 60 days.

(21) Appl. No.: 14/382,433

(22) PCT Filed: Jun. 20, 2012

(86) PCT No.: PCT/CN2012/077239
§ 371 (c)(1),
(2), (4) Date: Sep. 2, 2014

(87) PCT Pub. No.: WO2013/159442
PCT Pub. Date: Oct. 31, 2013

(65) Prior Publication Data
US 2015/0098399 A1    Apr. 9, 2015

(30) Foreign Application Priority Data
Apr. 28, 2012   (CN) .......................... 2012 1 0131932

(51) Int. Cl.
*H04J 11/00*   (2006.01)
*H04B 7/204*   (2006.01)
(Continued)

(52) U.S. Cl.
CPC ........ *H04L 5/0053* (2013.01); *H04W 72/0406* (2013.01); *Y02B 60/50* (2013.01)

(58) Field of Classification Search
CPC ......... H04L 1/00; H04L 1/0072; H04L 1/06; H04L 5/0053; H04L 27/26; H04L 27/261; H04W 28/06; H04W 28/16; H04W 48/12; H04W 72/0406; H04W 72/1289; H04B 7/26; Y02B 60/50
USPC ........ 370/310–350, 203, 208–211, 431, 437, 370/441, 464–465, 473, 479–482, 535–545
See application file for complete search history.

(56) References Cited

U.S. PATENT DOCUMENTS 8,724,648 B2 *   5/2014   Zeng ..................... H04L 1/1861
                                                      370/329
8,855,062 B2 *  10/2014   Khandekar ........... H04W 99/00
                                                      370/329

(Continued)

FOREIGN PATENT DOCUMENTS

| | | |
|---|---|---|
| CN | 101383657 A | 3/2009 |
| CN | 101594205 A | 12/2009 |
| WO | 2011039408 A | 4/2011 |

OTHER PUBLICATIONS

International Search Report of PCT/CN2012/077239 dated Dec. 5, 2012.

*Primary Examiner* — Tri H Phan
(74) *Attorney, Agent, or Firm* — Banner & Witcoff, Ltd.

(57) ABSTRACT

A method for transmitting control signaling, an apparatus for processing control signaling and a terminal are provided. A base station transmits evolved control signaling to an evolved terminal on M downlink subframes in a radio frame, wherein M is an integer greater than or equal to 1 and less than N, and N is the number of the downlink subframes in the radio frame. The above technical solution enhances basic control signaling of an LTE-series standard, reduces system overhead and terminal energy consumption, meets demands for future development of the industry, solves the problem of large system overhead and high terminal energy consumption due to the wireless communication standards, and meanwhile also gives sufficient consideration to backward compatibility of the system, and better meets demands of data users rapidly developing and future development of the wireless communications industry.

14 Claims, 3 Drawing Sheets

(51) Int. Cl.
  *H04B 7/208* (2006.01)
  *H04J 1/00* (2006.01)
  *H04L 5/00* (2006.01)
  *H04W 72/04* (2009.01)

(56) References Cited

U.S. PATENT DOCUMENTS

| | | | |
|---|---|---|---|
| 9,215,730 B2* | 12/2015 | Dai | H04W 72/14 |
| 2010/0303013 A1 | 12/2010 | Khandekar et al. | |
| 2013/0235727 A1* | 9/2013 | Campbell | H04L 43/50 370/236 |
| 2014/0086141 A1* | 3/2014 | Morioka | H04W 40/08 370/315 |
| 2014/0161084 A1* | 6/2014 | Yang | H04L 1/1822 370/329 |
| 2014/0204900 A1* | 7/2014 | Kawasaki | H04L 5/0005 370/330 |
| 2015/0003384 A1* | 1/2015 | Kawasaki | H04W 72/042 370/329 |
| 2015/0237604 A1* | 8/2015 | Shi | H04W 72/042 370/330 |

* cited by examiner

CONTROL SIGNALING TRANSMISSION METHOD, CONTROL SIGNALING PROCESSING DEVICE, AND TERMINAL

TECHNICAL FIELD

The present document relates to the field of wireless communications, and in particular, to a method for transmitting control signaling and an apparatus for processing control signaling, and a terminal.

BACKGROUND OF THE RELATED ART

With the development of mobile Internet and the popularity of smart phones, demands for mobile data traffic grow rapidly, and the rapid growth of data services puts forward severe challenges to the transmission capability of the mobile communication network. According to a forecast of an authority, in the next ten years (2011-2020), mobile data traffic will be doubled every year, and increases one thousand times in ten years.

Most of the mobile data services mainly occur in doors and hot-pot environment, and are embodied as a nomadic/local wireless access scenario. According to statistics, at present, nearly 70% of the mobile data services occur in doors, and the proportion will continue to grow, and is expected to be more than 80% in 2012. The data services are mainly Internet services. The demands for the quality of service are relatively unitary, and are far lower than the demands of traditional telecommunication services on the quality of service.

The cellular mobile communication system is mainly for purpose of design of the traditional telecommunication services such as mobile and seamless switch, and has a low efficiency and a high cost when carrying high-traffic low-speed Internet Protocol (IP) data packet services. Taking a Long Term Evolution (LTE) standard using an Orthogonal Frequency Division Multiplexing (OFDM) technology as an example, the design is for purpose of meeting the traditional telecommunication demands such as mobile and seamless switch in terms of the frame structure, resource allocation, control channels, pilots, network architecture etc., which results in a large system control overhead and increases implementation complexity and cost of the product. In order to adapt to market trends, there is a need for a low-cost solution adapted to nomadic/local wireless data access in the field of cellular mobile communications.

Physical downlink control signaling (basic control signaling) of the LTE related standards needs to be transmitted on each downlink subframe through a physical downlink control channel, and a basic terminal in an "active state" (i.e., a terminal supporting the LTE system standards) generally needs to try to decode downlink control signaling on each downlink subframe, to determine whether information related to itself is included in the related signaling. A feature of such mechanism is that a transmission interval is short, and spectral efficiency of basic control signaling is low, which not only results in large downlink control overhead, but also increases power consumption of the terminal, and reduces standby time of the terminal, thereby not complying with concept of green communication.

SUMMARY OF THE INVENTION

For the problem of large system overhead and high terminal energy consumption due to design defect of the control signaling in the communication system, the present document is intended to provide a method for transmitting control signaling, an apparatus for processing control signaling and a terminal, which are used to solve the above problem.

In order to solve the above technical problem, the present document further provides a method for transmitting control signaling, applied in a communication system of a long term evolution standard, wherein, a base station transmits evolved control signaling to an evolved terminal on M downlink subframes in a radio frame, wherein M is an integer greater than or equal to 1 and less than N, and N is a number of the downlink subframes included in the radio frame.

Preferably, the above method may further comprise the following features:

N is divisible by M;

or the M downlink subframes are first M downlink subframes in the radio frame;

or when N is divisible by M and M is greater than 1, two adjacent downlink subframes in the M downlink subframes for transmitting the evolved control signaling are spaced by ((N/M)−1) subframes;

or when N is not divisible by M and M is greater than 1, two adjacent downlink subframes in the M downlink subframes for transmitting the evolved control signaling are spaced by floor((N/M)−1) subframes, wherein, floor is a round down function;

or when N is not divisible by M and M is greater than 1, two adjacent downlink subframes in the M downlink subframes for transmitting the evolved control signaling are spaced by floor(N/M) subframes, wherein, floor is a round down function.

Preferably, the above method may further comprise the following features:

positions of the M downlink subframes for transmitting the evolved control signaling in the radio frame are configured by default; or the base station notifies the evolved terminal of the positions of the M downlink subframes for transmitting the evolved control signaling in the radio frame through signaling.

Preferably, the above method may further comprise the following features:

the base station only transmits basic control signaling on other downlink subframes except the M downlink subframes in the radio frame; or the base station only transmits the basic control signaling on the M downlink subframes.

Preferably, the above method may further comprise the following features:

the M downlink subframes are multicast broadcast single frequency network subframes.

Preferably, the above method may further comprise the following features:

the base station only transmits basic control signaling with broadcast or multicast property on the M downlink subframes.

Preferably, the above method may further comprise the following features:

orthogonal frequency division multiplexing symbols used by the base station for transmitting the evolved control signaling on the M subframes are different from orthogonal frequency division multiplexing symbols used by the base station for transmitting the basic control signaling.

Preferably, the above method may further comprise the following features:

the base station notifies the evolved terminal to decode basic control signaling on the radio frame through signaling;

or the base station notifies the evolved terminal whether to transmit the basic control signaling on the radio frame through signaling.

Preferably, the above method may further comprise the following features:

the base station only transmits the evolved control signaling in the radio frame.

Preferably, the above method may further comprise the following features:

time-frequency resources used by the base station for transmitting the evolved control signaling are configured by default, or are notified by the base station to the evolved terminal through signaling.

Preferably, the above method may further comprise the following features:

downlink time-frequency resources allocated to the evolved terminal in the evolved control signaling are located on multicast broadcast single frequency network subframes of the radio frame; or the downlink time-frequency resources allocated to the evolved terminal in the evolved control signaling are inter-subframe resources or inter-frame resources.

Preferably, the above method may further comprise the following features:

the basic control signaling is basic control signaling related to the evolved terminal.

Preferably, the above method may further comprise the following features:

the evolved terminal is a terminal capable of decoding the evolved control signaling.

In order to solve the above technical problem, the present document further provides an apparatus for processing control signaling, located in a base station, wherein, the apparatus for processing control signaling comprises a control signaling processing module, wherein, the control signaling processing module is configured to transmit evolved control signaling to an evolved terminal on M downlink subframes in a radio frame, wherein M is an integer greater than or equal to 1 and less than N, and N is a number of the downlink subframes included in the radio frame.

In order to solve the above technical problem, the present document further provides an evolved terminal, comprising a signaling decoding processing module, wherein, the signaling decoding processing module is configured to only try to decode basic control signaling on M downlink subframes of a radio frame used by the base station for transmitting evolved control signaling and/or try to decode the basic control signaling on other downlink subframes except the M downlink subframes in the radio frame, wherein M is an integer greater than or equal to 1 and less than N, and N is a number of the downlink subframes included in the radio frame.

In order to solve the above technical problem, the present document further provides a method for transmitting control signaling, applied in a communication system of a long term evolution standard, wherein, a base station notifies an evolved terminal whether to transmit one or more of the following information in a radio frame through signaling: evolved control signaling, basic control signaling and resources used for transmitting the evolved control signaling.

Preferably, the above method may further comprise the following features:

the evolved terminal is a terminal capable of decoding the evolved control signaling.

Preferably, the above method may further comprise the following features:

the signaling is located in the radio frame or a frame before the radio frame.

At least one of the above technical schemes enhances the basic control signaling of an LTE-series standard, reduces system overhead and terminal energy consumption, and meets demands for future development of the industry.

PREFERRED EMBODIMENTS OF THE INVENTION

Preferred embodiments of the present document will be described below in conjunction with accompanying drawings. In the case of no conflict, the embodiments of the present document and the features in the embodiments could be combined randomly with each other.

The evolved terminal in the present scheme is a terminal capable of decoding evolved control signaling, and an evolved terminal can also decode basic control signaling.

A basic terminal can only decode the basic control signaling, and can not decode the evolved control signaling.

Figure 1:
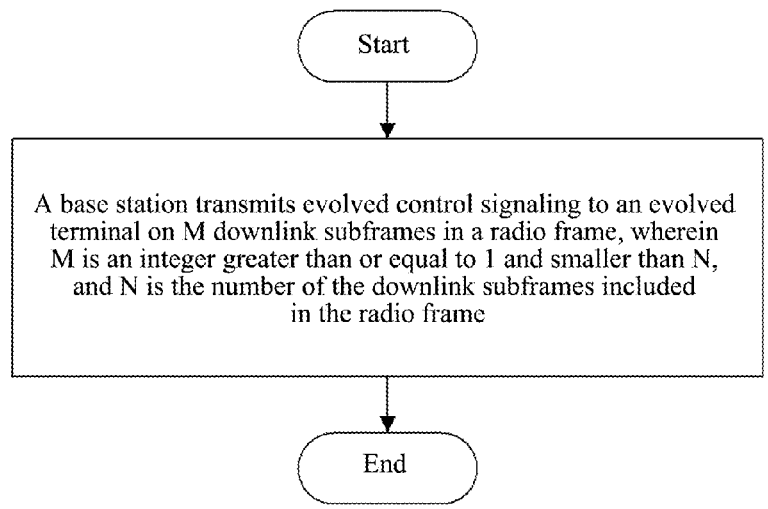
FIG. 1 is a diagram of a method for transmitting evolved control signaling.

FIG. 1 is a flowchart of an implementation of a method for transmitting evolved control signaling according to an embodiment of the present document, which mainly comprises the following processes: a base station transmitting evolved control signaling to an evolved terminal on M downlink subframes in a radio frame, wherein M is an integer greater than or equal to 1 and less than N, and N is the number of the downlink subframes included in the radio frame.

In the method, the evolved terminal receives the evolved control signaling.

The Mode for setting positions of M subframes in the radio frame may be one of the following modes:

N is divisible by M;

the M downlink subframes are the first M downlink subframes in the radio frame;

when N is divisible by M and M is greater than 1, two adjacent downlink subframes in the M downlink subframes for transmitting the evolved control signaling are spaced by ((N/M)−1) subframes;

when N is not divisible by M and M is greater than 1, two adjacent downlink subframes in the M downlink subframes for transmitting the evolved control signaling are spaced by floor((N/M)−1) subframes, wherein, floor is a round down function;

when N is not divisible by M and M is greater than 1, two adjacent downlink subframes in the M downlink subframes for transmitting the evolved control signaling are spaced by floor(N/M) subframes, wherein, floor is a round down function.

The base station only transmits basic control signaling on other downlink subframes except the M downlink subframes in the radio frame.

The base station only transmits the basic control signaling on the M downlink subframes.

Positions of the M downlink subframes for transmitting the evolved control signaling in the radio frame are configured by default; or the base station notifies the evolved terminal of the positions of the M downlink subframes for transmitting the evolved control signaling in the radio frame through signaling.

The basic control signaling is basic control signaling related to the evolved terminal, i.e., basic control signaling needed to be transmitted to the evolved terminal, for example, is basic control signaling for allocating wireless transmission resources to the evolved terminal etc. Similarly, basic control signaling unrelated to the evolved terminal refers to basic control signaling destined for a terminal which is a basic terminal.

The M downlink subframes are multicast broadcast single frequency network subframes.

The base station only transmits basic control signaling with broadcast or multicast property on the M downlink subframes.

The orthogonal frequency division multiplexing symbols used by the base station for transmitting the evolved control signaling on the M subframes are different from orthogonal frequency division multiplexing symbols used by the base station for transmitting the basic control signaling.

The base station notifies the evolved terminal to decode basic control signaling on the radio frame through signaling.

The base station notifies the evolved terminal whether to transmit the basic control signaling on the radio frame through signaling.

The base station only transmits the evolved control signaling in the radio frame.

Time-frequency resources used by the base station for transmitting the evolved control signaling are configured by default, or are notified by the base station to the evolved terminal through signaling.

Downlink time-frequency resources allocated to the evolved terminal in the evolved control signaling are located on multicast broadcast single frequency network subframes of the radio frame.

The downlink time-frequency resources allocated to the evolved terminal in the evolved control signaling are inter-subframe resources or inter-frame resources.

The evolved terminal only tries to decode the basic control signaling on the M downlink subframes in the radio frame.

The evolved terminal only tries to decode the basic control signaling on other downlink subframes except the M downlink subframes in the radio frame.

An apparatus for processing control signaling in a base station, which is used to implement the above method, comprises a control signaling processing module, wherein, the control signaling processing module is configured to transmit evolved control signaling to an evolved terminal on M downlink subframes in a radio frame, wherein M is an integer greater than or equal to 1 and less than N, and N is the number of the downlink subframes included in the radio frame.

The specific implementation of the control signaling processing module is the same as that described in the above method, and the description thereof will be omitted.

An evolved terminal in the present scheme comprises a signaling decoding processing module, wherein, the signaling decoding processing module is configured to only try to decode basic control signaling on M downlink subframes of a radio frame used by the base station for transmitting evolved control signaling and/or try to decode the basic control signaling on other downlink subframes except the M downlink subframes in the radio frame, wherein M is an integer greater than or equal to 1 and less than N, and N is the number of the downlink subframes included in the radio frame.

The specific implementation of the signaling decoding processing module is the same as that described in the above method, and the description thereof will be omitted.

The present scheme will be further described below in conjunction with specific embodiments one to twenty and FIG. 2.

Specific Embodiment One

In a communication system using an LTE-series standard, a base station notifies an evolved terminal of positions of M downlink subframes through signaling, wherein a value of M is an integer greater than or equal to 1 and less than N, and N is the number of the downlink subframes included in the radio frame and is divisible by M.

The base station transmits evolved control signaling to an evolved terminal on M downlink subframes in a radio frame.

The evolved terminal receives the evolved control signaling.

Specific Embodiment Two

In a communication system using an LTE-series standard, a base station transmits evolved control signaling to an evolved terminal on M downlink subframes in a radio frame, wherein the M downlink subframes are the first M downlink subframes in the radio frame, a value of M is an integer greater than or equal to 1 and less than N, and N is the number of the downlink subframes included in the frame.

The evolved terminal receives the evolved control signaling.

Specific Embodiment Three

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the radio frame.

Figure 2A:
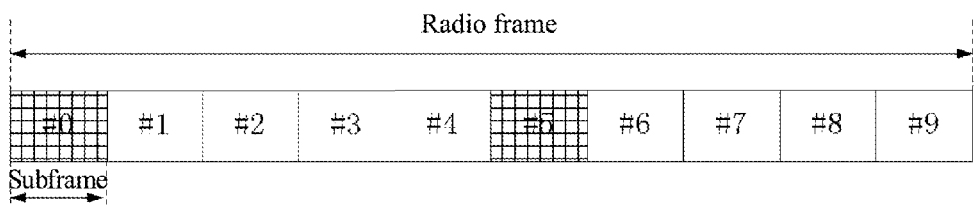
FIGS. 2(a)-(j) are diagrams of positions where evolved control singling is transmitted in M subframes in a radio frame according to an embodiment.

When N is dividable by M and M is greater than 1, two downlink subframes in the M downlink subframes for transmitting the evolved control signaling are spaced by $((N/M)-1)$ subframes. As shown in FIG. 2(a), when N=10 and M=2, two adjacent subframes (subframe #0 and subframe #5) for transmitting the evolved control signaling are spaced by 4 subframes.

The evolved terminal receives the evolved control signaling.

Specific Embodiment Four

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Figure 2B:
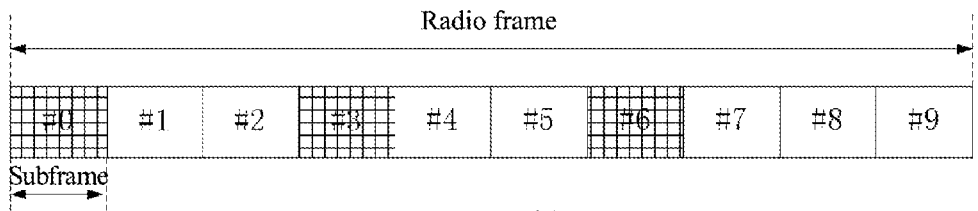
Figure 2C:
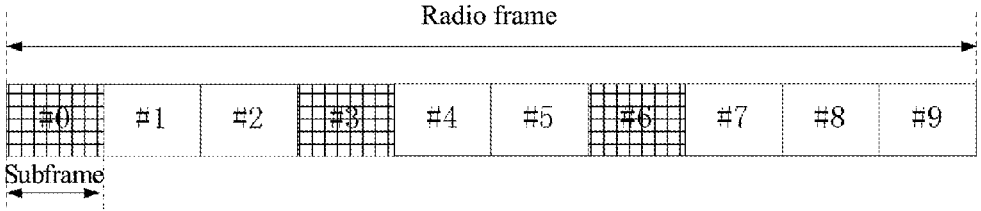

When N is not dividable by M and M is greater than 1, two adjacent downlink subframes in the M downlink subframes for transmitting the evolved control signaling are spaced by floor$((N/M)-1)$ subframes, wherein, floor is a round down operation. As shown in FIG. 2(b), when N=10 and M=3, two adjacent subframes (subframe #0, subframe #3 and subframe #6) for transmitting the evolved control signaling are spaced by 2 subframes, or as shown in FIG. 2(c), when N=10 and M=3, two adjacent subframes (subframe #1, subframe #4 and subframe #7) for transmitting the evolved control signaling are spaced by 2 subframes.

The evolved terminal receives the evolved control signaling.

Specific Embodiment Five

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Figure 2D:
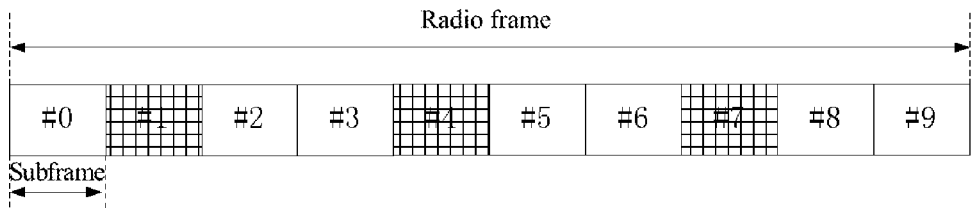

When N is not dividable by M and M is greater than 1, two adjacent downlink subframes in the M downlink subframes for transmitting the evolved control signaling are spaced by floor(N/M) subframes, wherein, floor is a round down operation. As shown in FIG. 2(d), when N=10 and M=3, two adjacent subframes (subframe #0, subframe #4 and subframe #8) for transmitting the evolved control signaling are spaced by 3 subframes.

The evolved terminal receives the evolved control signaling.

The Modes for setting positions of M subframes for transmitting the evolved control signaling in the radio frame in the above specific embodiments one to five are preferred modes. Compared to a mode for transmitting basic control signaling in each downlink subframe in the prior art, the present method can reduce a degree of complexity of the process of a terminal detecting control signaling belonging to the terminal itself, save power consumption of the terminal, and reduce signaling overhead of the system.

Specific Embodiment Six

In a communication system using an LTE-series standard, a base station transmits evolved control signaling to an evolved terminal on M downlink subframes in a radio frame, wherein positions of the M downlink subframes are configured by default according to the standard without the need of the base station notifying the evolved terminal through signaling, a value of M is an integer greater than or equal to 1 and less than N, and N is the number of the downlink subframes included in the frame.

Wherein, positions of the M subframes in the radio frame may be set based on any of modes for setting positions in embodiments one to five.

The evolved terminal receives the evolved control signaling.

Specific Embodiment Seven

In a communication system using an LTE-series standard, a base station notifies an evolved terminal of positions of M downlink subframes in the radio frame through signaling, wherein a value of M is an integer greater than or equal to 1 and less than N, and N is the number of the downlink subframes included in the frame.

The base station transmits the evolved control signaling to the evolved terminal on M downlink subframes in a radio frame.

Wherein, positions of the M subframes in the radio frame may be set based on any of modes for setting positions in embodiments one to five.

The evolved terminal receives the evolved control signaling.

In the above specific embodiments 6 and 7, modes of positions of M subframes being default or being notified by the base station to the evolved terminal can save signaling overhead of the system.

Specific Embodiment Eight

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2E:
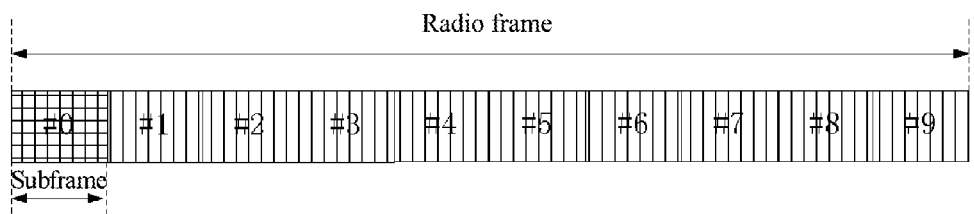

The base station only transmits the basic control signaling on other downlink subframes except the M downlink subframes in the radio frame. As shown in FIG. 2(e), the base station transmits the evolved control signaling on subframe #0 and transmits the basic control signaling on other subframes. Preferably, the basic control signaling is basic control signaling related to the evolved terminal.

The evolved terminal receives the evolved control signaling and/or basic control signaling.

The evolved terminal does not need to try to decode the basic control signaling on the M downlink subframes.

Specific Embodiment Nine

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2F:
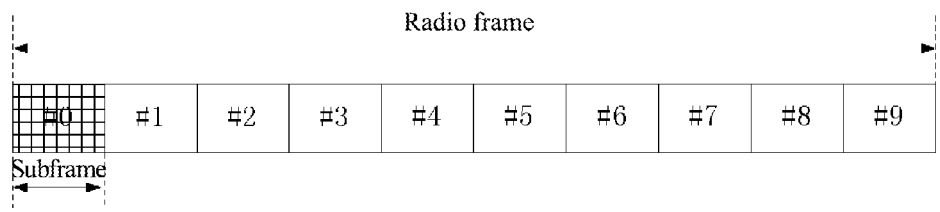

The base station only transmits the basic control signaling on the M downlink subframes. As shown in FIG. 2(f), the base station transmits the evolved control signaling and the basic control signaling on subframe #0 and does not transmit the basic control signaling on other subframes.

The evolved terminal receives the evolved control signaling and/or basic control signaling.

Specific Embodiment Ten

In a communication system using An LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2G:
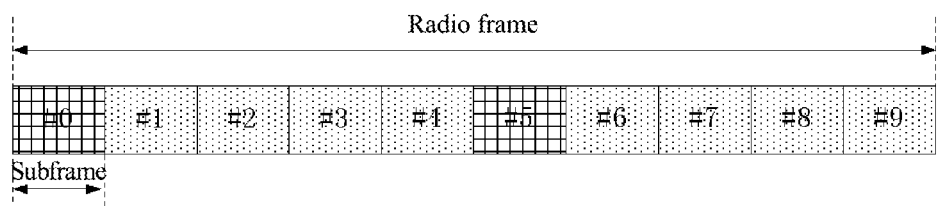

The base station only transmits the basic control signaling on the M downlink subframes. As shown in FIG. 2(g), the base station transmits the evolved control signaling and/or the basic control signaling related to the evolved terminal on subframes #0 and #5 and transmits the basic control signaling unrelated to the evolved terminal on other subframes.

The evolved terminal receives the evolved control signaling and/or basic control signaling.

Specific Embodiment Eleven

In a communication system using an LTE-series standard, a base station transmits evolved control signaling to an evolved terminal on M downlink subframes in a radio frame, wherein the M downlink subframes are multicast broadcast single frequency network subframes, a value of M is an integer greater than or equal to 1 and less than N, and N is the number of the downlink subframes included in the frame.

Wherein, positions of the M subframes in the radio frame may be set based on any of modes for setting positions in embodiments one to five.

The evolved terminal receives the evolved control signaling.

Specific Embodiment Twelve

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

The basic control signaling having broadcast or multicast property is only transmitted by the base station on the M downlink subframe, and for the basic control signaling having broadcast or multicast property, the cyclic redundancy check fields thereof are obtained by functions of random network temporary identities having broadcast or multicast property (random network temporary identities dedicated to the terminal correspond thereto). An advantage thereof is that the evolved terminal can well communicate with the system without decoding control information on other subframes except the M subframes.

Wherein, positions of the M subframes in the radio frame may be set based on any of modes for setting positions in embodiments one to five.

The evolved terminal receives the evolved control signaling.

Specific Embodiment Thirteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2H:
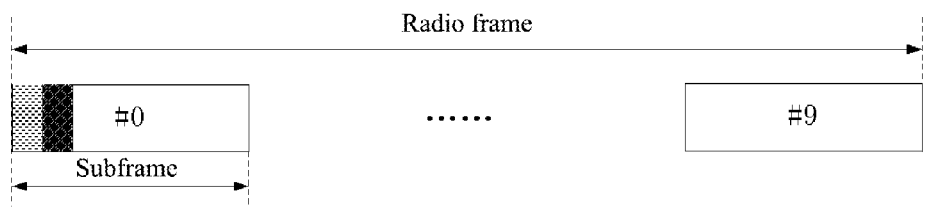

The OFDM symbols used by the base station to transmit evolved control signaling on the M subframes are different from the OFDM symbols used for the basic control signaling. As shown in FIG. 2(h), in the subframe #0, the basic control signaling is transmitted in the first shadow region, and the evolved control signaling is transmitted in the second shadow region.

Preferably, time-frequency resources used by the base station to transmit the evolved control signaling are configured by default according to the standard or notified by the base station to the terminal through signaling, The evolved terminal receives the evolved control signaling and/or basic control signaling.

Specific Embodiment Fourteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

The OFDM symbols used by the base station to transmit evolved control signaling on the M subframes are different from the OFDM symbols used for the basic control signaling. As shown in FIG. 2(h), in the subframe #0, the basic control signaling is transmitted in the first shadow region, and the evolved control signaling is transmitted in the second shadow region.

The evolved terminal receives the evolved control signaling and/or basic control signaling.

Specific Embodiment Fifteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

The base station notifies the evolved terminal to decode the basic control signaling on the radio frame through signaling.

The evolved terminal receives the evolved control signaling and/or basic control signaling.

Specific Embodiment Sixteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

The base station only transmits the evolved control signaling in the radio frame.

The evolved terminal receives the evolved control signaling.

Specific Embodiment Seventeen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2I:
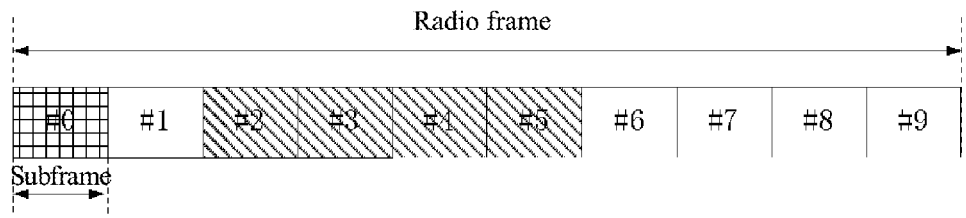

Downlink time-frequency resources allocated by the evolved control signaling to the evolved terminal are located on multicast broadcast single frequency network subframes in the radio frame. As shown in FIG. 2(i), evolved control signaling is transmitted to the evolved terminal on subframe #0 to allocate resources on subframes #2, #3, #4 and #5. Such subframes are configured by the base station as MBSFN subframes.

The evolved terminal receives the evolved control signaling.

Specific Embodiment Eighteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

Figure 2J:
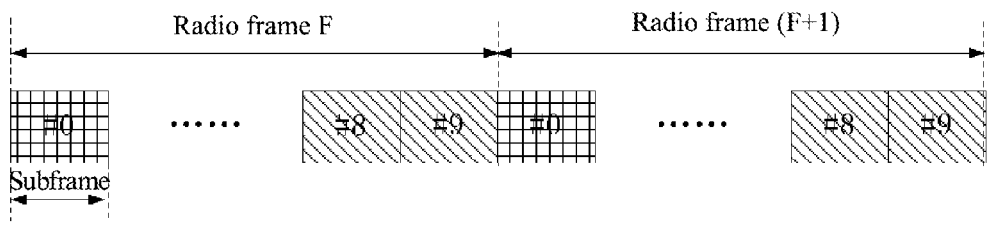

Downlink time-frequency resources allocated by the evolved control signaling to the evolved terminal are inter-subframe or inter-frame resources. As shown in FIG. 2(i), evolved control signaling is transmitted to the evolved terminal on subframe #0 to allocate resources on subframes #2, #3, #4 and #5, and as shown in FIG. 2(j), evolved control signaling is transmitted to the evolved terminal on subframe #0 in the radio frame to allocate resources on subframes #8 and #9 in the radio frame and subframes #8 and #9 in the (F+1)th frame.

The evolved terminal receives the evolved control signaling.

Specific Embodiment Nineteen

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

The evolved terminal receives the evolved control signaling.

The evolved terminal only tries to decode the basic control signaling on the M downlink subframes in the radio frame.

Specific Embodiment Twenty

In a communication system using an LTE-series standard, a base station transmits evolved control signaling to an evolved terminal on M downlink subframes in a radio frame, wherein a value of M is an integer greater than or equal to 1 and less than N, and N is the number of the downlink subframes included in the frame.

Wherein, positions of the M subframes in the radio frame may be set based on any of modes for setting positions in embodiments one to five.

The evolved terminal receives the evolved control signaling.

The evolved terminal only tries to decode the basic control signaling on other downlink subframes except the M downlink subframes.

In the specific embodiments one to twenty, the evolved terminal is a terminal capable of decoding evolved control signaling.

In the specific embodiments one to twenty, time-frequency resources used by the base station to transmit the evolved control signaling are configured by default according to the standard or notified by the base station to the terminal through signaling, In the specific embodiments eight to twenty, the mode of the base station transmitting evolved control signaling and/or basic control signaling in a radio frame provides a new signaling transmission solution in a communication system where the evolved control signaling and the basic control signaling are compatible. The evolved terminal can receive and perform the evolved control signaling dedicated to the evolved system in the communication system where the evolved control signaling and the basic control signaling are compatible, and can also receive and perform the basic control signaling commonly used in the basic system.

Figure 3:
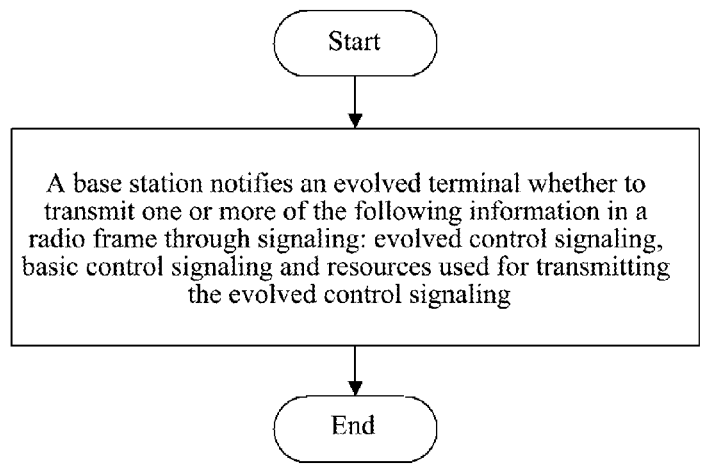
FIG. 3 is a diagram of another method for transmitting evolved control signaling according to an embodiment.

FIG. 3 is a flowchart of an implementation of a method for transmitting evolved control signaling according to an embodiment of the present document, which mainly includes the following processes: a base station notifies an evolved terminal whether to transmit one or more of the following information in a radio frame through signaling: evolved control signaling, basic control signaling and resources used for transmitting the evolved control signaling.

The present method will be further described below in conjunction with specific embodiments twenty one to twenty seven.

Specific Embodiment Twenty One

In a communication system using an LTE-series standard, a base station notifies an evolved terminal whether to transmit evolved control signaling and basic control signaling in a radio frame through signaling.

The evolved terminal receives the signaling. If the signaling indicates that the evolved control signaling and the basic control signaling are not transmitted in the radio frame, the evolved terminal does not need to try to decode related control signaling on the radio frame; and if the signaling indicates that the evolved control signaling and the basic control signaling are transmitted in the radio frame, the evolved terminal needs to try to decode related control signaling on the radio frame.

Specific Embodiment Twenty Two

In a communication system using an LTE-series standard, a base station notifies an evolved terminal whether to transmit evolved control signaling in a radio frame through signaling.

The evolved terminal receives the signaling. If the signaling indicates that the evolved control signaling is not transmitted in the radio frame, the evolved terminal does not need to try to decode related control signaling on the radio frame, and the evolved terminal also does not need to try to decode the basic control signaling on the radio frame; and if the signaling indicates that the evolved control signaling is transmitted in the radio frame, the evolved terminal needs to try to decode related control signaling on the radio frame.

Specific Embodiment Twenty Three

In a communication system using an LTE-series standard, a base station notifies an evolved terminal whether to transmit evolved control signaling in a radio frame through signaling.

The evolved terminal receives the signaling. If the signaling indicates that the evolved control signaling is not transmitted in the radio frame, the evolved terminal does not need to try to decode related control signaling on the radio frame, and the evolved terminal needs to try to decode the basic control signaling on the radio frame; and if the signaling indicates that the evolved control signaling is transmitted in the radio frame, the evolved terminal needs to try to decode related control signaling on the radio frame.

Specific Embodiment Twenty Four

In a communication system using an LTE-series standard, a base station notifies an evolved terminal whether to transmit basic control signaling in a radio frame through signaling.

The evolved terminal receives the signaling. If the signaling indicates that the basic control signaling is not transmitted in the radio frame, the evolved terminal does not need to try to decode related control signaling on the radio frame, and the evolved terminal does not need to try to decode the evolved control signaling on the radio frame; and if the signaling indicates that the basic control signaling is transmitted in the radio frame, the evolved terminal needs to try to decode related control signaling on the radio frame.

Specific Embodiment Twenty Five

In a communication system using an LTE-series standard, a base station notifies an evolved terminal whether to transmit basic control signaling in a radio frame through signaling.

The evolved terminal receives the signaling. If the signaling indicates that the basic control signaling is not transmitted in the radio frame, the evolved terminal does not need to try to decode related control signaling on the radio frame, and the evolved terminal needs to try to decode the evolved control signaling on the radio frame; and if the signaling indicates that the basic control signaling is transmitted in the radio frame, the evolved terminal needs to try to decode related control signaling on the radio frame.

Specific Embodiment Twenty Six

In a communication system using an LTE-series standard, a base station notifies an evolved terminal whether to transmit evolved control signaling in a radio frame and notifies the evolved terminal of resource information used for transmitting the evolved control signaling.

The evolved terminal receives the signaling, and tries to decode the evolved control signaling on the radio frame.

Specific Embodiment Twenty Seven

In a communication system using an LTE-series standard, a base station notifies the evolved terminal of resource information used for transmitting the evolved control signaling in a radio frame through signaling.

The evolved terminal receives the signaling, and tries to decode the evolved control signaling on the radio frame.

In the specific embodiments twenty one to twenty seven, the evolved terminal is a terminal capable of decoding evolved control signaling.

In the specific embodiments twenty one to twenty seven, the signaling is located in the radio frame or a frame before the radio frame.

In the specific embodiments twenty one to twenty seven, the evolved control signaling or the basic control signaling is control signaling related to the evolved terminal.

It should be illustrated that the evolved control signaling in the present patent can also be referred to as evolved control signaling, and the evolved terminal can also be referred to as an evolved terminal.

It should be illustrated that, in the case of no conflict, the embodiments of the present application and the features in the embodiments could be combined randomly with each other.

Of course, the present document can have a plurality of other embodiments. Without departing from the spirit and essence of the present document, those skilled in the art can make various corresponding changes and variations according to the present document, and all these corresponding changes and variations should belong to the protection scope of the appended claims in the present document.

A person having ordinary skill in the art can understand that all or part of steps in the above method can be implemented by programs instructing related hardware, which can be stored in a computer readable storage medium, such as a read-only memory, a disk or a disc etc. Alternatively, all or part of steps in the above embodiments can also be implemented by one or more integrated circuits. Accordingly, each module/unit in the above embodiments can be implemented in the form of hardware, or can also be implemented in the form of software functional module. The present document is not limited to any particular form of a combination of hardware and software.

INDUSTRIAL APPLICABILITY

The embodiments of the present document are used to solve the problem of large system overhead and high terminal energy consumption due to the wireless communication standards, and meanwhile give sufficient consideration to backward compatibility of the system, and better meet demands for rapidly developing data users and future development of the wireless communications industry.

What we claim is:

1. A method for transmitting control signaling, applied in a communication system of a long term evolution standard, comprising:

transmitting evolved control signaling by a base station to an evolved terminal on M downlink subframes in a radio frame, wherein M is an integer greater than or equal to 1 and less than N, and N is a number of the downlink subframes included in the radio frame;

wherein, orthogonal frequency division multiplexing symbols used by the base station for transmitting the evolved control signaling on the M subframes are different from orthogonal frequency division multiplexing symbols used by the base station for transmitting basic control signaling.

2. The method according to claim 1, wherein,

N is divisible by M;

or the M downlink subframes are first M downlink subframes in the radio frame;

or when N is divisible by M and M is greater than 1, two adjacent downlink subframes in the M downlink subframes for transmitting the evolved control signaling are spaced by ((N/M)−1) subframes;

or when N is not divisible by M and M is greater than 1, two adjacent downlink subframes in the M downlink subframes for transmitting the evolved control signaling are spaced by floor((N/M)−1) subframes, wherein, floor is a round down function;

or when N is not divisible by M and M is greater than 1, two adjacent downlink subframes in the M downlink subframes for transmitting the evolved control signaling are spaced by floor(N/M) subframes, wherein, floor is a round down function.

3. The method according to claim 1, wherein, positions of the M downlink subframes for transmitting the evolved control signaling in the radio frame are configured by default; or the base station notifies the evolved terminal of the positions of the M downlink subframes for transmitting the evolved control signaling in the radio frame through signaling.

4. The method according to claim 1, further comprising:

the base station transmitting basic control signaling only on other downlink subframes except the M downlink subframes in the radio frame; or the base station transmitting the basic control signaling only on the M downlink subframes.

5. The method according to claim 1, wherein, the M downlink subframes are multicast broadcast single frequency network subframes.

6. The method according to claim 1, further comprising:

the base station transmitting basic control signaling with broadcast or multicast property only on the M downlink subframes.

7. The method according to claim 1, further comprising:

the base station notifies the evolved terminal to decode basic control signaling on the radio frame through signaling; or the base station notifies the evolved terminal whether to transmit the basic control signaling on the radio frame through signaling.

8. The method according to claim 1, wherein, the base station only transmits the evolved control signaling in the radio frame.

9. The method according to claim 1, wherein, time-frequency resources used by the base station for transmitting the evolved control signaling are configured by default, or are notified by the base station to the evolved terminal through signaling.

10. The method according to claim 1, wherein, downlink time-frequency resources allocated to the evolved terminal in the evolved control signaling are located on multicast broadcast single frequency network subframes of the radio frame; or the downlink time-frequency resources allocated to the evolved terminal in the evolved control signaling are inter-subframe resources or inter-frame resources.

11. The method according to claim 1, wherein,
the basic control signaling is basic control signaling related to the evolved terminal.

12. The method according to claim 1, wherein,
the evolved terminal is a terminal decoding the evolved control signaling.

13. An apparatus for processing control signaling, located in a base station, wherein,
the apparatus for processing control signaling comprises a control signaling processing module, wherein,
the control signaling processing module is configured to transmit evolved control signaling to an evolved terminal on M downlink subframes in a radio frame, wherein M is an integer greater than or equal to 1 and less than N, and N is a number of the downlink subframes included in the radio frame;
wherein, orthogonal frequency division multiplexing symbols used by the base station for transmitting the evolved control signaling on the M subframes are different from orthogonal frequency division multiplexing symbols used by the base station for transmitting basic control signaling.

14. An evolved terminal, comprising a signaling decoding processing module, wherein,
the signaling decoding processing module is configured to only try to decode basic control signaling on M downlink subframes of a radio frame used by the base station for transmitting evolved control signaling;
or the signaling decoding processing module is configured to try to decode the basic control signaling on other downlink subframes except the M downlink subframes in the radio frame;
wherein M is an integer greater than or equal to 1 and less than N, and N is a number of the downlink subframes included in the radio frame;
wherein, orthogonal frequency division multiplexing symbols used for transmitting the evolved control signaling on the M subframes are different from orthogonal frequency division multiplexing symbols used for transmitting basic control signaling.

* * * * *